United States Patent
Muthiah et al.

(10) Patent No.: US 11,573,893 B2
(45) Date of Patent: Feb. 7, 2023

(54) STORAGE SYSTEM AND METHOD FOR VALIDATION OF HINTS PRIOR TO GARBAGE COLLECTION

(71) Applicant: Western Digital Technologies, Inc., San Jose, CA (US)

(72) Inventors: Ramanathan Muthiah, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 649 days.

(21) Appl. No.: 16/569,163

(22) Filed: Sep. 12, 2019

(65) Prior Publication Data
US 2021/0081316 A1 Mar. 18, 2021

(51) Int. Cl.
*G06F 12/02* (2006.01)
*G06F 13/16* (2006.01)
*G06F 3/06* (2006.01)

(52) U.S. Cl.
CPC ........ *G06F 12/0253* (2013.01); *G06F 3/0616* (2013.01); *G06F 3/0653* (2013.01); *G06F 3/0659* (2013.01); *G06F 3/0673* (2013.01); *G06F 13/1694* (2013.01)

(58) Field of Classification Search
CPC .. G06F 12/0253; G06F 3/0616; G06F 3/0653; G06F 3/0659; G06F 3/0673; G06F 13/1694
See application file for complete search history.

(56) References Cited

U.S. PATENT DOCUMENTS

| | | | |
|---|---|---|---|
| 6,209,003 B1* | 3/2001 | Mattis | G06F 12/0253 |
| 10,007,442 B2 | 6/2018 | Hahn et al. | |
| 10,101,918 B2 | 10/2018 | Hahn et al. | |
| 11,093,408 B1* | 8/2021 | Solganik | G06F 12/0269 |
| 2010/0211539 A1 | 8/2010 | Ho | |
| 2013/0046917 A1 | 2/2013 | Yang et al. | |
| 2014/0289492 A1 | 9/2014 | Ranjith Reddy et al. | |
| 2016/0054931 A1 | 2/2016 | Romanovsky et al. | |
| 2016/0188687 A1 | 6/2016 | Nair | |
| 2017/0139825 A1 | 6/2017 | Dubeyko et al. | |
| 2018/0267720 A1* | 9/2018 | Goldberg | G06F 3/0679 |
| 2018/0276117 A1 | 9/2018 | Purgason | |

(Continued)

FOREIGN PATENT DOCUMENTS

WO  WO 2016-178594 A1  11/2016

OTHER PUBLICATIONS

Buytaert, Dries, et al. "Garbage collection hints." International Conference on High-Performance Embedded Architectures and Compilers. Springer, Berlin, Heidelberg, 2005. (Year: 2005).*

(Continued)

*Primary Examiner* — Nicholas J Simonetti
(74) *Attorney, Agent, or Firm* — Crowell & Moring LLP

(57) ABSTRACT

A storage system and method for validation of hints prior to garbage collection are provided. In one embodiment, a method is provided comprising receiving a command from a host to store data in a memory; storing, in the memory, the data and a hint that characterizes the data; determining whether the hint is still valid; and in response determining that the hint is still valid, using the hint in performing garbage collection. Other embodiments are provided.

20 Claims, 4 Drawing Sheets

(56) References Cited

U.S. PATENT DOCUMENTS

| | | | |
|---|---|---|---|
| 2019/0121572 A1 | 4/2019 | Zhou | |
| 2019/0155749 A1* | 5/2019 | Hahn | .................... G06F 12/126 |
| 2020/0257621 A1* | 8/2020 | Pletka | ................... G06F 3/0688 |

OTHER PUBLICATIONS

Li, Jun, et al. "Pattern-based write scheduling and read balance-oriented wear-leveling for solid state drivers." 2019 35th Symposium on Mass Storage Systems and Technologies (MSST). IEEE, 2019. (Year: 2019).*

International Search Report and Written Opinion for corresponding PCT Patent Application Serial No. PCT/US2020/024315 dated Jul. 15, 2020.

U.S. Appl. No. 15/633,307 entitled "Adaptive System for Optimization of Non-Volatile Storage Operational Parameters" filed Jun. 26, 2017, Ariel Navon et al.

* cited by examiner

STORAGE SYSTEM AND METHOD FOR VALIDATION OF HINTS PRIOR TO GARBAGE COLLECTION

BACKGROUND

Storage systems can be used with hosts that run applications that handle a lot of data and multiple data streams, with intensive reading, writing, and rewriting of data in the memory of the storage system. A host can send a storage system a write command, along with a start logical block address, data length, and a hint, such as information related to data association for a group. The storage system in turn picks the best available open host block/stream in memory to write the data under the circumstances based on the data pattern and the hint provided by the host. As more and more data is written to the storage system, the degree of fragmentation increases, leading to a drop in performance of the storage system.

DETAILED DESCRIPTION

Overview

Figure 1A:
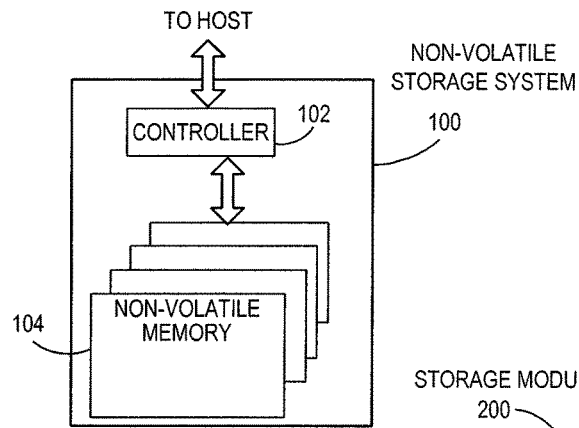
FIG. 1A is a block diagram of a non-volatile storage system of an embodiment.

By way of introduction, the below embodiments relate to a storage system and method for validation of hints prior to garbage collection. In one embodiment, a method is provided comprising receiving a command from a host to store data in a memory; storing, in the memory, the data and a hint that characterizes the data; determining whether the hint is still valid; and in response determining that the hint is still valid, using the hint in performing garbage collection.

In some embodiments, the method further comprises in response determining that the hint is not still valid, replacing the hint with a new hint.

In some embodiments, a read pattern of the data is used to determine whether the hint is still valid.

In some embodiments, the read pattern comprises a log of read commands.

In some embodiments, the read pattern is derived.

In some embodiments, at least one garbage collection parameter is used to determine whether the hint is still valid.

In some embodiments, the at least one garbage collection parameter comprises one or both of the following: data age and a validity count associated with the data.

In some embodiments, the hint is received from the host.

In some embodiments, the hint is derived by the storage system.

In some embodiments, the hint is stored as metadata in a flash management unit.

In some embodiments, the hint characterizes the data by indicating one or more of the following: whether or not the data will be updated frequently, a file type for the data, a sequence of logical block addresses associated with the data, whether the data is part of an existing file, whether the data replaces data of an existing file, and whether the data is a copy of a file already stored in the memory.

In some embodiments, the determining is triggered by a determination to perform garbage collection.

In some embodiments, the hint is used in performing garbage collection to determine whether to move the data to a single-level cell or a multi-level cell.

In another embodiment, a storage system is provided comprising a memory and a controller. The controller is configured to attempt to validate a stored hint that characterizes data stored in the memory; and in response to the attempt to validate the stored hint being successful, use the stored hint to perform garbage collection.

In some embodiments, the controller is further configured to in response to the attempt to validate the stored hint being unsuccessful, replace the hint with a new hint.

In some embodiments, the controller is further configured to attempt to validate the stored hint using a read pattern of the data.

In some embodiments, the controller is further configured to attempt to validate the stored hint using at least one garbage collection parameter.

In some embodiments, the hint is received from a host.

In some embodiments, the hint is derived by the controller.

In some embodiments, the memory comprises a three-dimensional memory.

In some embodiments, the storage system is configured to be integrated in a host.

In some embodiments, the storage system is configured to be removably connected with a host.

In another embodiment, a storage system is provided comprising a memory; means for receiving a command from a host to store data in the memory; means for storing, in the memory, the data and a hint that characterizes the data; means for determining whether the hint is still valid; and means for in response determining that the hint is still valid, using the hint in performing garbage collection.

Other embodiments are possible, and each of the embodiments can be used alone or together in combination. Accordingly, various embodiments will now be described with reference to the attached drawings.

Embodiments

Figure 1B:
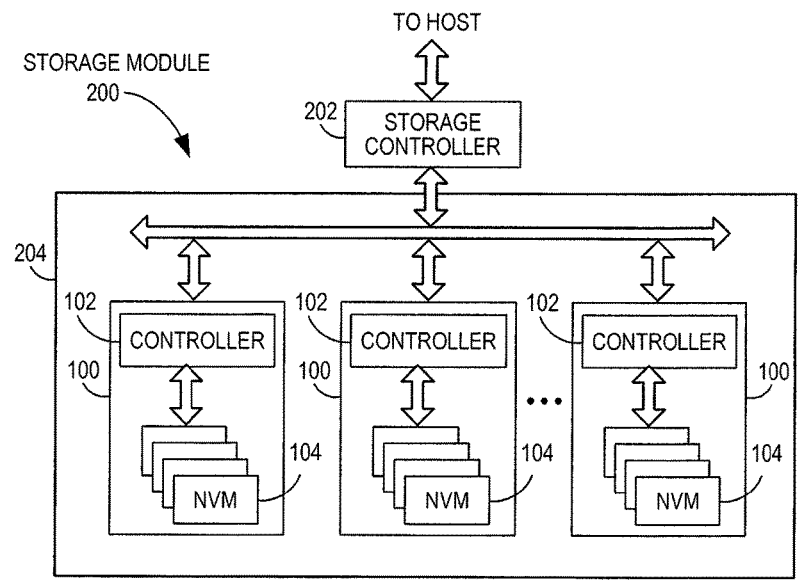
FIG. 1B is a block diagram illustrating a storage module of an embodiment.
Figure 1C:
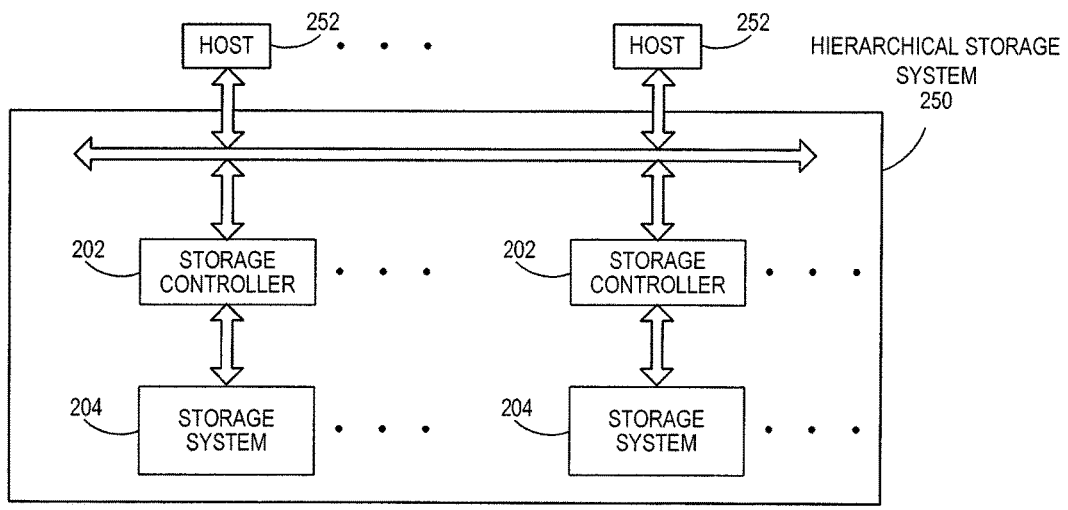
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
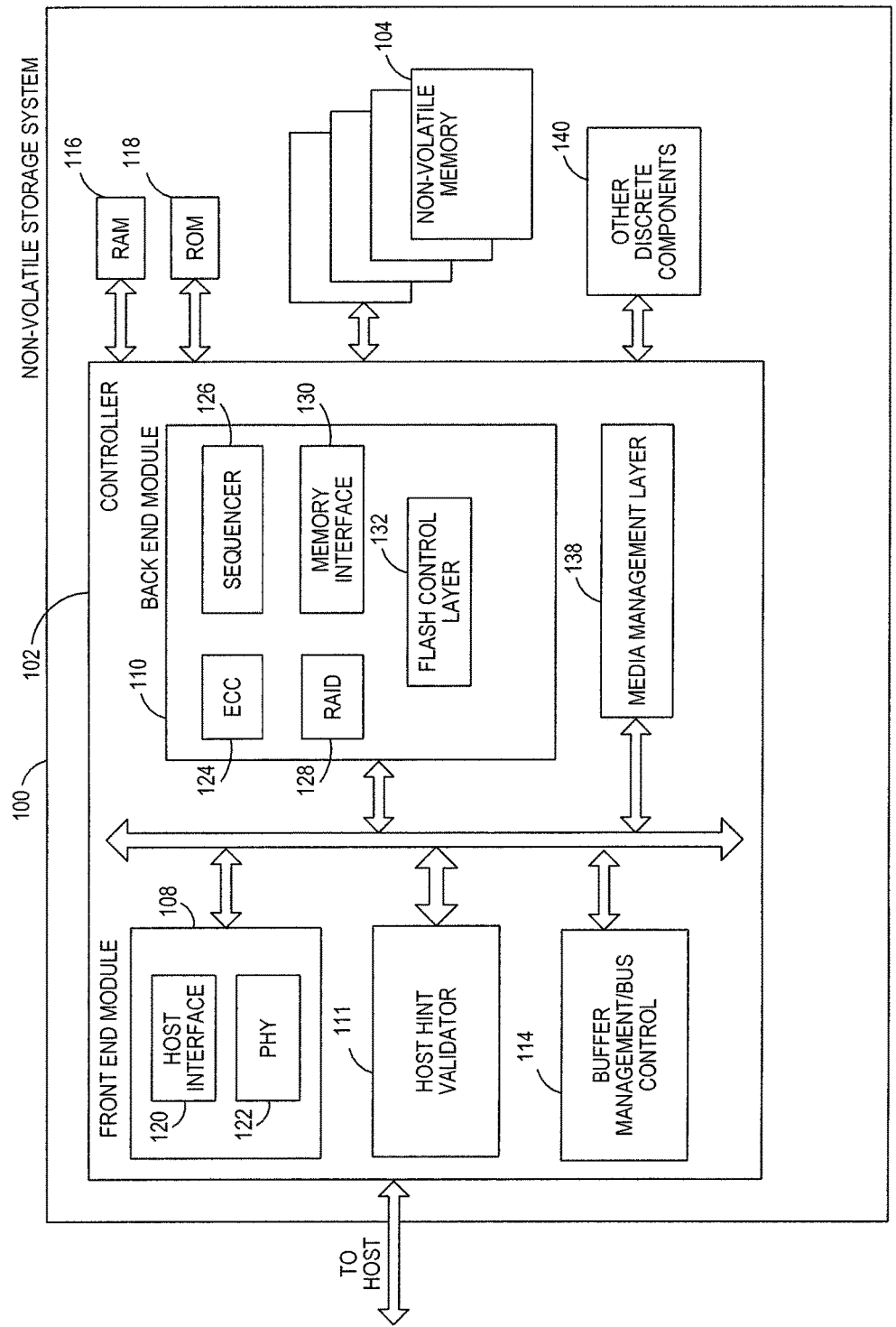
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a host hint validator 111, which is discussed in more detail below, and can be implemented in hardware or software/firmware. The host hint validator 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
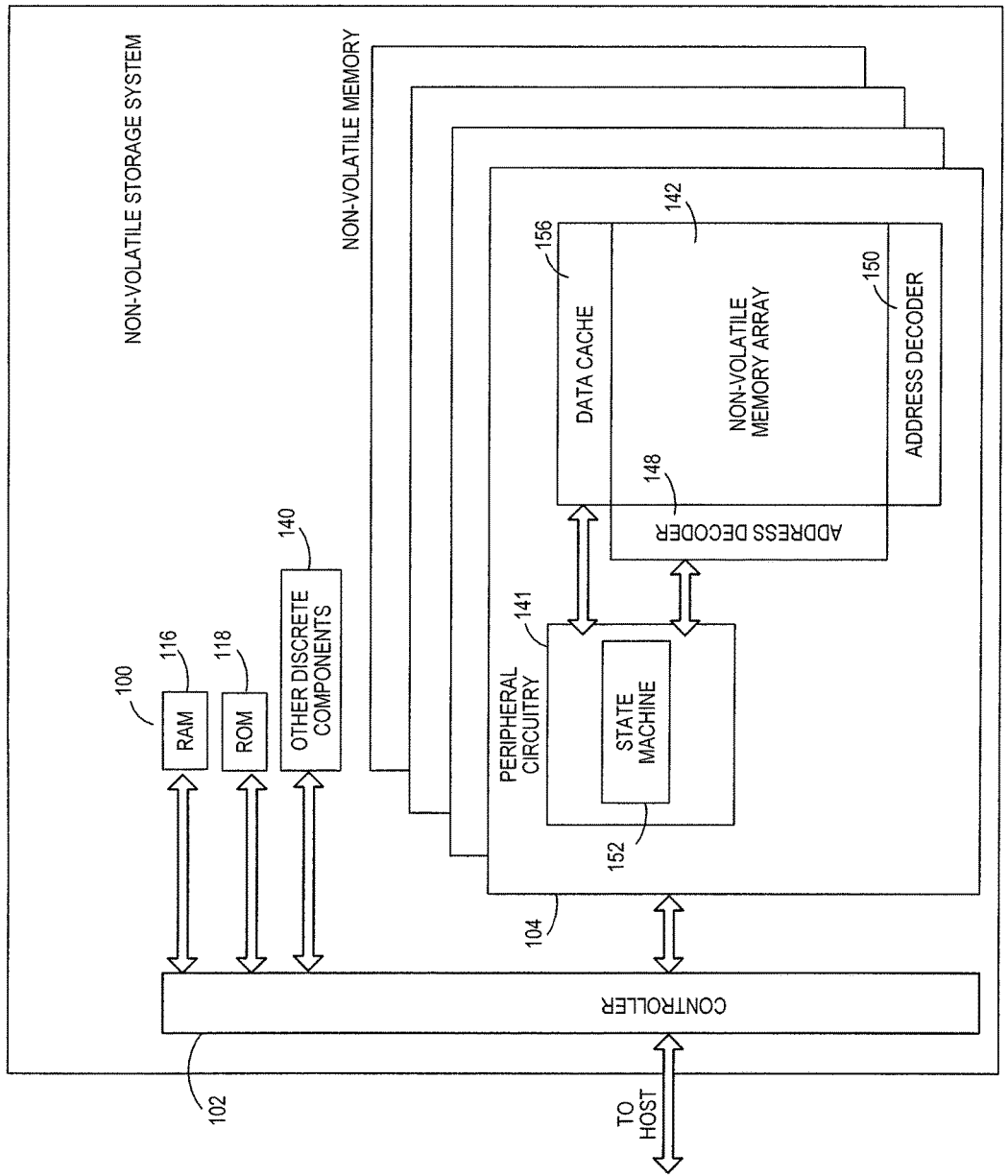
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

A host can send the storage system 100 a write command, along with a start logical block address, data length, and a hint, and the storage system 100 can use the hint to pick the best available memory location to write the data. Instead of being provided a hint by the host, the storage system 100 can derive the hint. For example, the storage system 100 can automatically detect patterns in data to be written in memory 104 during data streaming and derive hints from the patterns regarding how the data will likely be accessed by the host (sequential detection). As another example, the storage system 100 may instead or additionally utilize frequency of accesses of memory locations and file system metadata to derive hints and to determine how to best optimize utilization of storage system's resources. Other ways of deriving a hint are possible.

The hint may provide information regarding characteristics of the data, such as, for example, whether or not the data will be updated frequently, a file type for the data such as whether the file is an executable file, sequences of logical block addresses associated with the data, whether the data is part of an existing file, whether the data replaces data of an existing file, whether the data is a copy of a file already stored at the storage system 100, or any other type of information that may be useful to the storage system 100 when processing and/or storing data.

If the storage system 100 has access to just the command logical region and the size and not to the hints, the storage system 100 can route the data according to the data pattern and its internal logic. However, if the storage system 100 has access to hints, the storage system 100 can use the hints to segregate the data at program time according to characteristics provided in the hints. For example, if the hint suggests that the data is a photo, the data is likely to be written only once and then read sequentially. Such a file can be stored in static memory cells that have a relatively-low number of remaining program and erase cycles, as it is unlikely that even for read operations the photo file will be frequently accessed. In addition, the photo file may be distributed across the memory 104 in a manner that is optimal for sequential read access. It may also be desirable to store the photo file with other photo files that were created around the same time, as accesses to photo files that relate to the same event are likely to occur together. As another example, if the hint suggests that the data is an executable file, the data is likely to be written once and then read sequentially when the corresponding program is executed. An executable file may therefore be stored or distributed across memory cells in a manner that is optimal for sequential read accesses. The executable file may be stored in static or dynamic regions of memory 104 depending on the type of program and anticipated frequency of access. As yet another example, if the hint suggests that the data is a swap file, the data will likely be frequently accessed because it enables an operating system to use secondary storage devices to simulate extra memory. When the storage system 100 runs low on memory 104, it swaps a section of the system's RAM 116 that an idle program is using to free up memory 104 for other programs. A swap file is preferably stored in a dynamic region of memory in view of the frequent access and low latency requirement of a swap file.

More information about how hints can be generated, derived, and used can be found in U.S. Pat. Nos. 10,007,442 and 10,101,918, both of which are hereby incorporated by reference.

As mentioned above, hints can be used to separate data during initial write into separate open blocks in memory 104. However, in one embodiment, the storage system 100 stores a hint that characterizes the data in the memory 100, so that the hint can be used at a later time. The hint, which can be provided by the host or derived by the storage system 100, can be tagged to the data prior to the memory programming operation. For example, the hint can be stored as metadata, such as in a flash management unit or in another location. As used herein, a flash management unit (FMU) is a fundamental unit of data that can be stored in memory cells. Logical-to-physical address tables can manage entries at FMU granularities. For example, for a 4 kilobytes FMU size, a logical-to-physical address table entry can correspond to 4 kilobytes of data. An FMU may also be referred to as a logical block or logical fragment. As another example, the hint can be stored in a hint table that correlates hints and logical block address ranges. Other ways of storing a hint can be used.

Because the hint is stored, the hint can be used at a later time (i.e., not just when the storage system 100 decides where and how to initially store the data). This can be advantageous in performing garbage collection to defragment the memory 104. As mentioned above, over time with writing and rewriting of data in the memory 104, the degree of fragmentation of the data increases, leading to a drop in performance of the storage system 100. During garbage collection when blocks of data are considered for relocation, the blocks may be grouped based on a random or sequential pattern.

To help improve the efficiency of the garbage collection process, the controller 102 of the storage system 100 of this embodiment can use the stored hint associated with the data to assist in the garbage collection process. With the hints available during garbage collection as a part of logical fragments, the storage system 100 can better stream the data to the appropriate capacity blocks. Such a segregation minimizes fragmentation and can segregate data, e.g., according to longevity, pattern and performance. For example, data with similar hints that suggest the data is in the same group, type, or application class can be stored together in the garbage collection process. That is, enabling a specific method of physically placing data in memory by, for example, type, class, and/or identifier during garbage collection can be helpful to avoid mixing data in memory 104 across multiple cycles of usage of the storage system 100.

As noted above, by storing the hint, the storage system 100 can leverage the hint for optimizing defragmentation at a later point during garbage collection. However, due to user and host behavior, the stored hint may no longer accurately characterize the data. In that case, using a hint to assist in garbage collection may not be helpful, and, in some situations, it may be counterproductive.

To address this issue, in one embodiment, the controller 102 (e.g., using the hint validator 111) determines whether the hint is still valid before garbage collection or at any suitable time after the data is stored (e.g., instead of validating the hint every garbage collection cycle, hint validation may be performed, for example, only once a week or once a month for cold data to prevent unnecessary churn). If the hint is still valid, the controller 102 uses the hint in performing garbage collection. If the hint is not still valid, the controller 102 can derive a new hint, replace the old hint with the new hint, and use the new hint in performing garbage collection.

Evaluating the validity of the hint during garbage collection enables the storage system 100 to decide on the usage of the hint with conviction. For example, a hint that indicates that the data is temporary would no longer be valid if the data is cold. As another example, a hint that indicates that the data is random access is no longer valid if the data is used for sequential reads. Using this hint-validation process, the storage system 100 would have a clear picture of the nature of the stored data during garbage collection to enable the storage system 100 to leverage the available hint information to defragment the data for multiple cycles in the storage system 100. So, if the original hint suggested that the data is temporary, the storage system 100 may have moved the data to a single-level cell (SLC) during garbage collection. However, if that hint was not validated and a new hint was generated, that new hint can suggest that the data be moved to a multi-level cell (MLC) instead. This provides a more-efficient garbage collection process that enables reduced write amplification and better performance due to fewer garbage collection operations.

Further, this process of deciding at garbage collection if it makes sense to apply the initial hint or to use a new one is especially helpful for low-cost storage systems as it enables better defragmentation of similar data class types in a cost-effective manner, as the firmware design in low-cost storage systems may not allow the storage system to use hints to perform data separation during a host write (e.g., such as when there are only one or two open blocks during write).

Any suitable technique can be used to validate the hint. In one embodiment, the host's behavior after the hint has been written is evaluated in order to validate the hint. For example, a read pattern of the data can be used to determine whether the hint is still valid. That is, analysis of host read behavior following the write of data but before garbage collection (e.g., host-indicated random access but read sequentially, or vice versa) can be used to strengthen the hint attached to the data before deciding on routing during garbage collection. In addition to or instead of a read pattern, at least one garbage collection parameter (e.g., data age and/or a validity count associated with the data (e.g., data tagged as temporary but with a high validity count would indicate that maybe the hint was wrong, or vice versa)) can be used to determine whether the hint is still valid. When used in combination, the tagged hint is evaluated along with internal device parameters to validate the hint to decide the routing during garbage collection.

Figure 5:
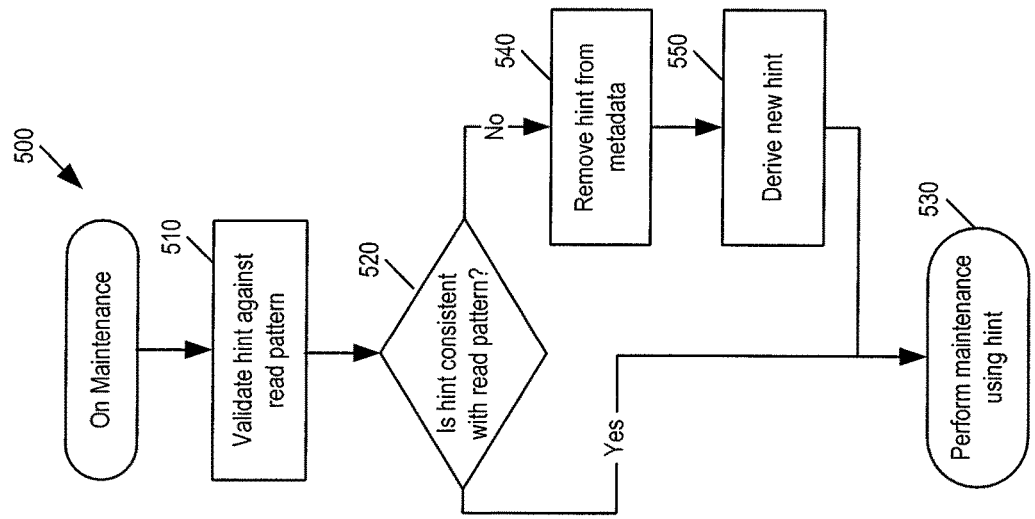
FIG. 5 is a flow chart of a method of an embodiment for performing maintenance using a hint.
Figure 4:
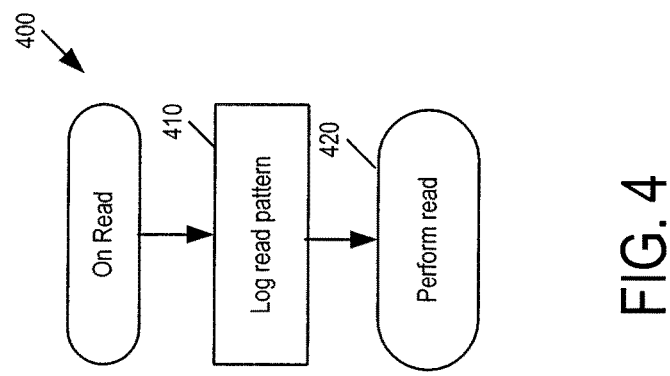
FIG. 4 is a flow chart of a method of an embodiment for performing a read operation.
Figure 3:
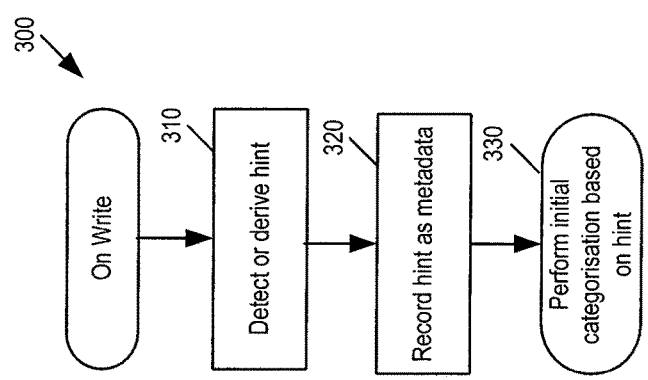
FIG. 3 is a flow chart of a method of an embodiment for performing initial categorization based on a hint.

Turning again to the drawings FIGS. 3-5 will now be discussed to illustrate one implementation. It should be noted that other implementations can be used. As shown in the flow chart 300 in FIG. 3, when the storage system 100 receives a command from the host to write data in the memory 104, the storage system 100 detects a hint provided by the host or derives a hint (e.g., from a data pattern) (act 310). Next, the storage system 100 records the hint as metadata (act 320). The storage system 100 then performs the initial categorization of data based on the hint (act 320).

As shown in the flow chart 400 of FIG. 4, the storage system 100 creates a log of the read patterns (act 410) as it subsequently executes read commands from the host (act 420). As shown in the flow chart 500 in FIG. 5, the log is used during garbage collection (maintenance). More specifically, before garbage collection takes place, the storage system 100 validates the hint against the read pattern in the log (act 510) to decide whether the hint is consistent with the read pattern (act 520). If the hint is consistent with the read pattern, the storage system 100 performs garbage collection using the hint (act 530). However, if the hint is not consistent with the read pattern, the storage system 100 removes the hint from the metadata (act 540), derives a new hint (act 550), and uses the new hint to perform garbage collection (act 530).

There are many alternatives that can be used with these embodiments. For example, in one of the embodiments discussed above, a log of read patterns was used to validate the hint. In an alternate embodiment, the read pattern may be derived statistically rather than logged. For instance, during a sweep of a specific marked logical block address range, read scrub statistics and counters may be used to derive read information, which can be used to validate hints. While a derived read pattern may be less precise than a read log, deriving a read pattern may be done without hardware changes in storage systems that do not have hardware support for logging read patterns.

As another alternative, in addition to or instead of using a read pattern to validate a hint (e.g., to determine whether the read pattern is sequential or random when the hint indicates otherwise), the storage system 100 can use other ways to validate a hint. For example, the storage system 100 can determine if the age of the data is consistent with the hint, whether the data is marked temporary when in fact it remained unmodified for a long period of time, whether the read frequency of the data is consistent with the hint, and/or whether the data was marked as infrequently-read when the data is being read often. Further, more-complex mechanisms can be used to validate the hint, such as those using machine learning algorithms, either locally trained or crowdsourced, as discussed in U.S. patent application Ser. No. 15/633,307, which is hereby incorporated by reference.

The source blocks for garbage collection can optionally be prioritized according to the open garbage collection destination block type for easier routing and earlier block write completion. Also, segregating and maintaining classwise data in garbage collection destination blocks across cycles ensures that when the particular application is uninstalled (the stored information is no more required), it ends up clearing up the whole metablock making garbage collection easier by avoiding data movement altogether. For instance, data related to one application can be stored in some specific garbage collection streams based on its longevity or randomness, such as media centric or game centric. The hint could be sometimes based on performance class with which the application is to be typically served for write and read. With a performance-related hint, potentially some data may be specifically moved back again to high-performance memory even after a few cycles of the storage system 100. Further, it may not be always possible to have as many garbage collection streams as applications/classes. To accommodate such cases of having multiple applications in a metablock, the controller 102 can group similarly-hinted streams together when the number of open blocks exceeds a threshold.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for using a validated hint in performing garbage collection, the method comprising:
   performing the following in a storage system comprising a memory:
   receiving a command from a host to store data in the memory;
   storing, in the memory, the data and a hint that characterizes the data, wherein the data is stored in an area of the memory that stores other data consistent with the hint;
   logging a read pattern of the data;
   validating the hint against the read pattern by determining whether the hint is consistent with the read pattern;
   in response to determining that the hint is consistent with the read pattern, using the hint in performing garbage collection; and
   in response to determining that the hint is not consistent with the read pattern:
   removing the hint;
   deriving a new hint; and
   using the new hint in performing garbage collection.

2. The method of claim 1, wherein the read pattern comprises a log of read commands.

3. The method of claim 1, wherein the read pattern is derived.

4. The method of claim 1, wherein at least one garbage collection parameter is used to validate the hint.

5. The method of claim 4, wherein the at least one garbage collection parameter comprises data age.

6. The method of claim 4, wherein the at least one garbage collection parameter comprises a validity count associated with the data.

7. The method of claim 1, wherein the hint is received from the host.

8. The method of claim 1, wherein the hint is derived by the storage system.

9. The method of claim 1, wherein the hint is stored as metadata in a flash management unit.

10. The method of claim 1, wherein the hint characterizes the data by indicating one or more of the following: whether or not the data will be updated frequently, a file type for the data, a sequence of logical block addresses associated with the data, whether the data is part of an existing file, whether the data replaces data of an existing file, and whether the data is a copy of a file already stored in the memory.

11. The method of claim 1, wherein the validating is triggered by a determination to perform garbage collection.

12. The method of claim 1, wherein the hint is used in performing garbage collection to determine whether to move the data to a single-level cell or a multi-level cell.

13. A storage system comprising:
   a memory; and
   a controller configured to be in communication with the memory, wherein the controller is further configured to:
   receive a command from a host to store data in the memory;

store, in the memory, the data and a hint that characterizes the data, wherein the data is stored in an area of the memory that stores other data consistent with the hint;
log a read pattern of the data;
validate the hint against the read pattern by determinin whether the hint is consistent with the read pattern;
in response to determining that the hint is consistent with the read pattern, use the hint in performing garbage collection; and
in response to determining that the hint is not consistent with the read pattern:
  remove the hint;
  derive a new hint; and
  use the new hint in performing garbage collection.

14. The storage system of claim 13, wherein the controller is further configured to attempt to validate the hint using at least one garbage collection parameter.

15. The storage system of claim 13, wherein the hint is received from a host.

16. The storage system of claim 13, wherein the hint is derived by the controller.

17. The storage system of claim 13, wherein the memory comprises a three-dimensional memory.

18. The storage system of claim 13, wherein the storage system is configured to be integrated in a host.

19. The storage system of claim 13, wherein the storage system is configured to be removably connected with a host.

20. A storage system comprising:
a memory;
means for receiving a command from a host to store data in the memory;
means for storing, in the memory, the data and a hint that characterizes the data, wherein the data is stored in an area of the memory that stores other data consistent with the hint;
means for logging a read pattern of the data;
means for validating the hint against the read pattern by determining whether the hint is consistent with the read pattern;
means for using the hint in performing garbage collection in response to determining that the hint is consistent with the read pattern; and
means for removing the hint, deriving a new hint, and using the new hint in performing garbage collection in response to determining that the hint is not consistent with the read pattern.

* * * * *